(No Model.)
A. B. BEALL & P. V. BAIL.
TRACK CLEANING MACHINE.
No. 486,526. Patented Nov. 22, 1892.
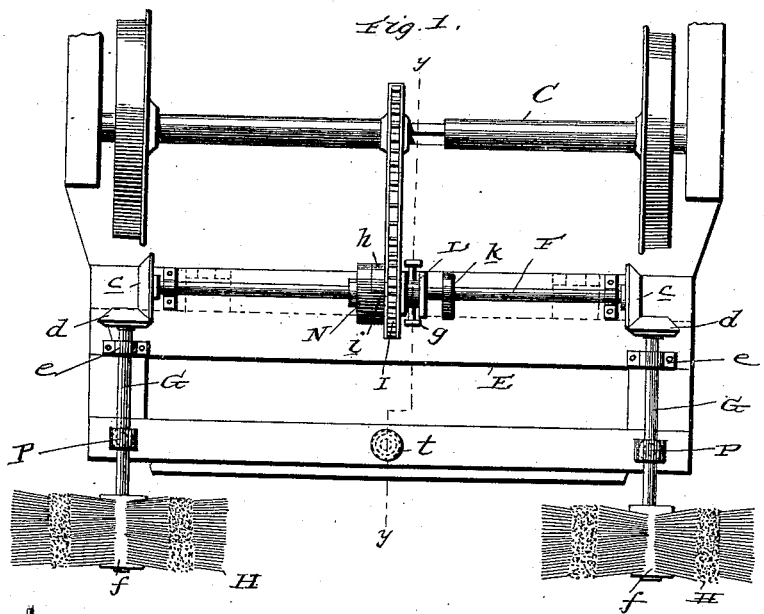
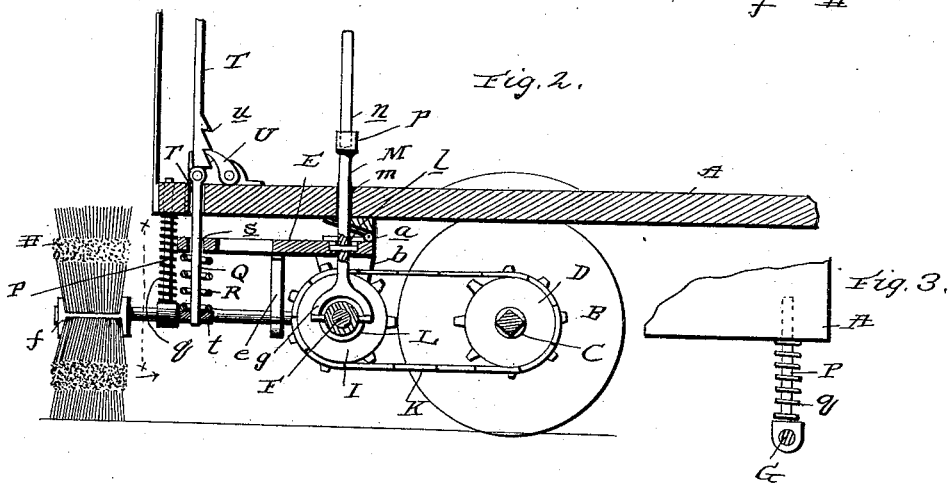
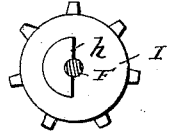
Witnesses:
Inventors
Alpheus B. Beall &
Philip V. Bail
By James J. Sheehy
Attorney

UNITED STATES PATENT OFFICE.

ALPHEUS B. BEALL AND PHILIP V. BAIL, OF SIOUX CITY, IOWA.

TRACK-CLEANING MACHINE.

SPECIFICATION forming part of Letters Patent No. 486,526, dated November 22, 1892.

Application filed May 19, 1892. Serial No. 433,637. (No model.)

*To all whom it may concern:*

Be it known that we, ALPHEUS B. BEALL and PHILIP V. BAIL, citizens of the United States, residing at Sioux City, in the county of Woodbury and State of Iowa, have invented certain new and useful Improvements in Track-Cleaning Machines; and we do declare the following to be a full, clear, and exact description of the invention, such as will enable others skilled in the art to which it appertains to make and use the same.

This invention relates to an improvement in that class of track-clearing devices in which rotatable brushes are arranged to operate above the rails of a track and to have power imparted to them from the axle of a car through the medium of a chain belt and gearing; and, among other things, the invention has for its object to provide cheap and efficient means for throwing the brushes in and out of operation, whereby unnecessary draft may be relieved from the draft-animals or motive power when the rails have been cleaned, to provide an effective and ready means for engaging and disengaging the operating mechanism from the rotative axle of the car-gearing, and to provide yielding devices interposed between the platform of a car and the brushes, so as to relieve the latter from injury which may result from obstructions upon the track, and to adapt such devices for ready attachment to a car and quick removal therefrom when desired.

Other objects and advantages will appear from the following description and claims when taken in connection with the annexed drawings, in which—

Figure 1 is an inverted plan view of the forward portion or platform of a car with our improvements applied. Fig. 2 is a longitudinal vertical sectional view taken in the plane indicated by the dotted line *y y* on Fig. 1. Fig. 3 is a sectional view of one of the brush-shafts, taken at the point indicated by the dotted line *x x* on Fig. 2. Fig. 4 is a side view of the toothed or pulley section of the clutch with the shaft in section therein, and Fig. 5 is a similar view from the opposite or engaging clutch-section.

Referring by letter to said drawings, A indicates the platform or floor of a street-car, which may be of any ordinary or approved construction.

B indicates the forward truck-wheels, and C indicates the axle therefor, all of which are of the form usually employed. This axle has keyed or othewise fixed to it a sprocket-wheel D.

E indicates a frame, which is of a suitable length and width to receive and sustain the rotatable brushes and other parts of our improvements, as will be presently described. This frame is hinged at its rear end to the under side of the car body or platform, as shown at *a*, so that the forward or opposite end may be raised by devices which will be presently explained. This frame carries at its inner or rear end and at opposite sides depending hangers *b*, in which is journaled a transverse shaft F. This shaft has fixed to its opposite ends beveled pinions *c*, which are designed to mesh with similar pinions *d*, fixed to the rear ends of the brush-shafts G. The frame E is furthermore provided on its under side and at opposite ends with hangers *e*, in which the shafts G, which are arranged parallel and in a position above the rails, are journaled and designed to rotate horizontally.

H indicates the rotatable brushes. These brushes may be formed from steel bristles or other suitable material fixed to a head *f*, and the securing devices may be of such a character as to permit the brushes being readily removed when impaired or injured and replaced by others. The shaft F has loosely arranged thereon a sprocket wheel or gear I, and this sprocket, which constitutes one-half of a clutch, is connected with the sprocket D on the car-axle C by means of a belt or chain K. This sprocket has fixed to its outer side a flanged collar L to receive the lower forked end *g* of a shifting-lever M, and the opposite side of this sprocket carries a lug *h*, designed to engage with a shoulder or lug *i* of the section N of the clutch, which latter section is fixed to the shaft F, so that it will always turn therewith. The shaft F is furthermore provided with a stop $k$ to limit the sliding movement of the sprocket-clutch section on said shaft.

The lever M, which is designed to shift the clutch or sprocket section thereof in and out of contact with the fixed section carried by the shaft F, passes through a slot $l$ in the frame E, and from thence through a slot $m$ in the platform, so that the lever may be brought within convenient reach of the driver or attendant of the car, and in order that this lever may not be in the way at such times as the sweeping or clearing mechanism is thrown out of operation we prefer to make the lever in two parts, having a removable upper part $n$, which may be placed in a socket $p$ at the top of the lower section, so that the upper section may be removed from the socket and placed away.

P indicates two vertical rods, there being one arranged over each brush shaft or frame in which said shafts are journaled. These rods pass through the platform, so as to permit them to move upwardly when the frame has been moved, so as to raise the brushes out of operation, and said rods are encircled by springs $q$, which bear at one end against the brush-shafts or their bearing-frame, and their opposite ends bear against the under side of the platform, so that the brushes may be held to the track under tension and allowed to yield should they contact with any obstruction which might otherwise injure the brushes or the operating mechanism.

Q indicates a rod. This rod passes through an aperature $r$ in the platform and thence through a hole or aperture $s$ in the frame E, and carries at its lower end a disk $t$, and interposed between the disk and the under side of the frame E is a spring R, which encircles said rod. Hinged to the upper end of this rod Q is a hand-lever T, having ratchet-teeth $u$ to engage with a pivoted pawl U, arranged on the upper side of the platform. By this construction it will be seen that the action of the spring R will have a tendency to draw down the rod Q, and consequently hold the teeth in the hand-lever T in engagement with the pivoted pawl, while the springs P will normally overcome such force of the spring R as would tend to raise the frame E, but will give, of course, to the power of the attendant as he may draw upon the hand-lever T in lifting the frame E, and consequently raising the brushes from the rails when it is desired to lift the device away from the ground, and by reason of this hand-lever being hinged it may, when desired, be turned down out of the way.

In operation it will be seen that when it is desirable to throw the brushes out of operation it is simply necessary to shift the clutch-lever in the desired direction and the brushes may be lifted from the rails by manipulating the hand-lever T.

While we have described in detail the parts in the exact construction shown and described, yet we are aware that many modifications may be made in the features of construction, and we therefore reserve the right to make such changes as may fall within the scope of our invention.

Having described our invention, what we claim is—

1. The combination, with a car-body and the forward axle thereof, of a sprocket-wheel fixed to said axle, a frame hinged to the under side of the body in advance of the axle, a transverse shaft journaled in said frame and carrying beveled gears at opposite ends, a slidable sprocket-wheel arranged on this shaft and adapted to form a part of the clutch, a clutch-section fixed to said shaft, a lever for shifting the clutch in and out of engagement, and suitable means for raising and lowering the free end of the hinged frame carrying the track-clearing brushes, substantially as specified.

2. The combination, with a car and the forward axle thereof, of a transverse shaft journaled in advance of said axle and connected therewith by a chain belt so as to receive motion therefrom, said shaft also having bevel-gears on opposite ends, a frame hinged beneath the forward portion of the car-body, rotatable brushes journaled in said frame and carrying gears to engage the gears on said transverse shaft, the spring interposed between the frame and car-body, the spring-surrounded rod connected to said frame, the ratchet-lever pivoted to the upper end of the rod, and the ratchet on the car-body for engaging said lever, all adapted to operate substantially as specified.

In testimony whereof we affix our signatures in presence of two witnesses.

ALPHEUS B. BEALL.
PHILIP V. BAIL.

Witnesses:
E. E. GRADY,
W. M. McKERCHER.